*INVENTORS*
DONALD F. NEUMANN
JOHN BLUMENTHAL
ROBERT S. VANCE
EDWARD C. SAND
Eber J. Hyde
ATTORNEY INVENTORS
DONALD F. NEUMANN
JOHN BLUMENTHAL
ROBERT S. VANCE
EDWARD C. SAND
BY
Eber J. Hyde
ATTORNEY

United States Patent Office 3,453,610

Patented July 1, 1969

3,453,610

MULTICHANNEL MAGNETIC TRANSDUCER HEAD HAVING FULL SHIELDS BETWEEN CHANNELS

Donald F. Neumann, Parkview, John Blumenthal, Wickliffe, Robert S. Vance, Warrensville Heights, and Edward C. Sand, Willoughby, Ohio, assignors to Clevite Corporation, a corporation of Ohio Original application Feb. 28, 1962, Ser. No. 176,198, now Patent No. 3,217,389, dated Nov. 16, 1965. Divided and this application Apr. 16, 1965, Ser. No. 448,814

Int. Cl. H04r *15/00*

U.S. Cl. 340—174.1 4 Claims

ABSTRACT OF THE DISCLOSURE

A multichannel magnetic transducer head is provided having full, unbroken shield means between core members which form transducing gaps. The core halves are mounted onto U-shaped brackets forming two rows facing each other. Each U-shaped bracket is provided with planar end leg faces to engage the planar end leg faces of the other U-shaped bracket of the pair when the pair is brought together. Each bracket has a smooth planar inner face located between the end leg faces onto which the core halves are mounted. There are no notches in or projections from the planar faces so that the brackets can be made easily and inexpensively.

This invention pertains to a magnetic transducer head having full shields between channels.

This application is a division of United States application Ser. No. 176,198 filed Feb. 28, 1962, now U.S. Patent 3,217,389, in the names of Donald F. Neumann, John Blumenthal, Robert S. Vance, and Edward C. Sand, and assigned to the same assignee as the present invention.

Magnetic transducer heads of the multichannel type, particularly for use in data storage equipment, have progressed to the point where the transducing channels must be extremely accurately located with respect to one another, both as to gap alignment and side-to-side spacing, and also the head must be so designed that a replacement head can be inserted in the machine with the exact gap and channel alignment as the head which is taken out. Otherwise, replacement of a head in a data storage machine can result in improper reproduction from the tapes which previously were recorded by another head.

At the present time each of these extremely accurate multichannel magnetic transducer heads are made using two toothed brackets in which the pole piece portions are mounted. These toothed brackets must be very, very accurately manufactured because it is the teeth and the spacing between the teeth which determine the accurate location of the pole piece portions. A magnetic transducer head having a large number of channels and using these toothed brackets becomes an extremely expensive item to manufacture. Each of the two brackets in the head is in effect a very accurate jig for the channel-to-channel or sideways location of the pole pieces, and when the head is sold of course the jig, being the bracket, is sold with it. This type of head is unsatisfactory in another aspect, because after two expensive brackets are put together and the head assembled, if there is one bad channel in the head it is very difficult and expensive to replace the one bad channel and in many instances the entire head is scrapped.

It is an object of the present invention to provide a multichannel magnetic transducer head wherein U-shaped brackets on which the individual pole pieces are mounted do not serve as jigs or fixtures to locate the channels and are therefore inexpensive compared to the toothed structures of the prior art; yet the channel-to-channel spacing of the heads is accurate, the gap alignment of the heads is accurate, and the head has the important gap alignment feature of Patent 2,888,522 to facilitate accurate replacement of the heads.

Another object of the present invention is to provide a multichannel magnetic transducer head structure wherein up to a certain point in the manufacture, if a bad channel is discovered, the channel can be removed and a good one substituted therefor without tearing the entire head apart and without undue cost.

For a better understanding of the present invention, together with other and further objects thereof, reference is had to the following description taken in connection with the accompanying drawings, and its scope will be pointed out in the appended claims.

An aspect of the present invention lies in the provision of a magnetic transducer head for use in computers or data storage equipment, wherein first and second substantially U-shaped brackets are utilized; each bracket having a top surface and a planar inner face which is located between the outwardly extending legs of the U. These legs terminate in planar leg faces the plane of which is parallel to the plane of the inner face. These two U-shaped brackets are connected together face to face with their planar leg faces in engagement wtih each other and with their planar inner faces spaced apart. A first plurality of accurately spaced apart, coil wound, pole piece members is secured to the front face and to the inner face of one of the brackets and a second plurality of accurately spaced apart, coil wound, pole piece members is secured to the front face and to the inner face of the other bracket. These two sub-assemblies when put together form a plurality of substantially closed magnetic core circuit means. A plurality of single piece or laminated full shield means extend between each two adjacent magnetic core circuit means and these shields have an extent which is at least equal to the extent of the magnetic core circuit means. There is also a plurality of spacer means which lie between and in engagement with the magnetic core circuit means and the full shielding means, spacing them apart a distance sufficient to accommodate the coil means which are wound around the core means. The magnetic core circuit means, the shielding means and the spacer means preferably are all formed of metal and together they form a full metal face against which the magnetic tape runs during recording or reproducing.

With reference to the drawings—

Figure 1:
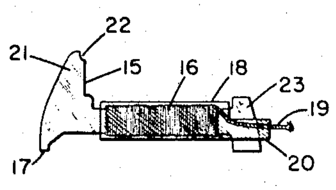
FIGURE 1 shows a pole piece about which a coil is wound. Two of these pole pieces mounted face-to-face are necessary to form a transducing head.

With reference to FIGURE 1 there is shown a magnetic pole piece portion 15 about which is wound a coil 16. It is understood that two of these pole pieces must be secured together face to face, preferably with a shim between the pole tip faces 17 to form the core of a magnetic transducer head. After the coil 16 is wound about the pole piece 15, folded insulating material 18 is positioned around both sides of the coil, and the very fine lead wires 19 are brought out between two spaced apart plastic end tabs 20 which are integral with the folded insulating material 18, forming protection for the very fine lead wires. The pole piece 15 has a shape somewhat similar to the head of a hammer in that it has an enlarged back portion 21 which is opposite the pole tip face 17. A notch 22 is provided in this portion 21 to facilitate electrical grounding of the separate pole pieces and shields in the finished head. The back portion 23 of the pole piece opposite the head 21 is raised to provide a portion which is utilized to held the pole piece in a jig while the head is being formed.

Figure 2:
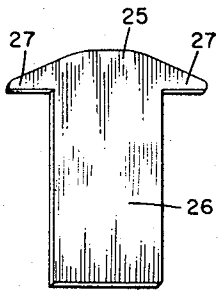
FIGURE 2 is a plan view showing the shield member.

FIGURE 2 illustrates a substantially T-shaped shield 25 having a body portion 26 and two outwardly extending arm portions 27. The area of the body portion 26 is sufficiently large that it will cover a core formed of two assembled pole pieces so that a single piece of shielding material located between two adjacent head channels substantially completely shields the two cores from each other and prevents undue cross-talk. Several such shields may be laminated together when space permits to effect increased shielding means.

Figure 3:
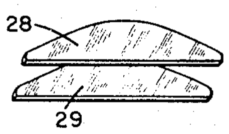
FIGURE 3 is an isometric view of the two spacers which fit one on either side of the shield member.

As shown in FIGURE 3 two spacers 28, 29 are provided. Each of these spacers has the same shape as the head portion of the shield and is of substantially the same size.

Figure 4:
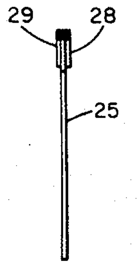
FIGURE 4 is an edge view of the shield member showing the two spacer members attached to it.

FIGURE 4 shows a sub-assembly formed of the shield 25 and the two spacer members 28, 29 cemented to either side of the shield, forming with the head portion thereof a smooth top surface.

Figures 5, 7:
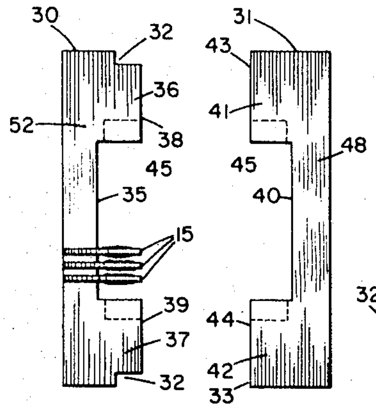
FIGURE 5 is a view looking down on the top face of one of the U-shaped brackets.
FIGURE 7 is a top view looking down on the other U-shaped bracket.
Figure 10:
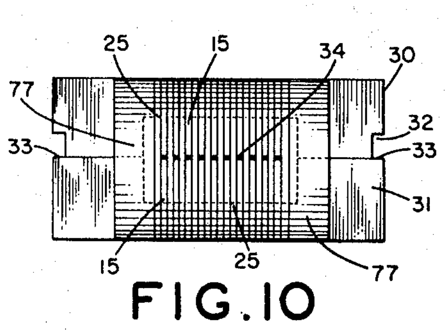
FIGURE 10 is a top view of a completed head.

FIGURE 5 is a top view of one of the two U-shaped brackets 30 which are needed in the manufacture of this head. The other U-shaped bracket 31 is shown in FIGURE 7. The bracket 30 has a notch 32 at each edge thereof. The bracket 31 is not notched. Consequently, when the two halves of the head are brought together as shown in FIGURE 10, the portion 33 of the bracket 31 which is opposite the notch 32 forms a mounting surface which is aligned with the gap 34 of the transducer channels. Thus, when a substitute head is mounted in a transducing device such as a data storage machine, utilizing the plane 33 to position the head, in accordance with the teaching of Patent 2,888,522, the operator is assured that the new transducer head is in perfect alignment with the position of the old head.

Figure 9:
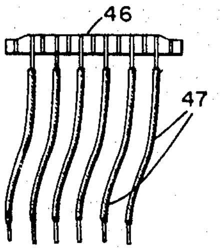
FIGURE 9 shows the terminal strip which becomes part of the head.
Figure 6:
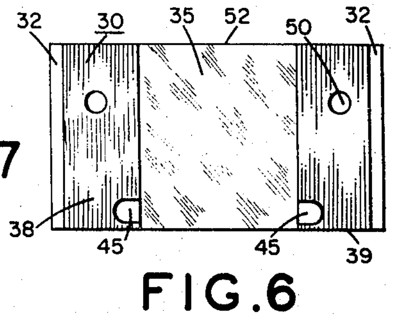
FIGURE 6 is a plan view looking at the front face of the bracket shown in FIGURE 5.

The first U-shaped bracket 30 has a planar inner face 35 located between the outwardly extending legs 36, 37 of the U and its legs 36 and 37 terminate in planar leg faces 38 and 39, the plane of which is parallel to the plane defined by the inner face 35. Similarly the second substantially U-shaped bracket 31 has a planar inner face 40 located between outwardly extending legs 41 and 42 of the U-shaped bracket and its legs 41 and 42 terminate in planar leg faces 43, 44, the plane of which is parallel to the plane 40 of the inner face. In each of the U-shaped brackets a groove 45 is provided to receive a terminal strip 46 which is shown in FIGURE 9.

Figure 8:
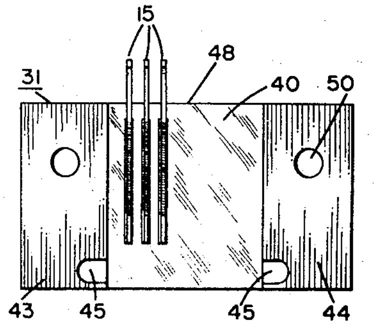
FIGURE 8 is a view looking at the front face of the bracket shown in FIGURE 7.

During the assembly of the head, as is more particularly described in connection with FIGURES 12 to 14, a plurality of pole pieces 15 are cemented to the inner face 35 and to the top surface 52 of the U-shaped bracket 30, the pole pieces being very carefully spaced and aligned by means of an accurate, reuseable jig. Only three such pole pieces are shown in FIGURE 5, but it is to be understood that the entire space between the legs 36, 37 may contain pole pieces. The only thing holding the pole pieces against the bracket is the cement which is used. There are no special notches or projections on the bracket which hold or space the pole pieces. Thus the cost of the bracket is kept to a minimum. Pole pieces are similarly secured to the flat front face 48 and to the inner face 40 of the bracket 31, as shown in FIGURE 8, it being understood that the number of pole pieces and their spacing corresponds to the number and spacing of the pole pieces attached to the bracket 35. At this point in the assembly a terminal strip 46 is positioned in each groove 45 in the brackets 30, 31 and the lead wires 19 of the coils are soldered to the terminal strip so that each pair of coil wires 19 is connected to a proper pair of terminal wires 47.

Each of the brackets with its attached pole pieces is then lapped to bring all of the pole tip faces 17 and the leg faces 38, 39 (or leg faces 43, 44, as the case may be) into a common plane, as is more particularly described in United States Patent 2,888,522.

Figure 11:
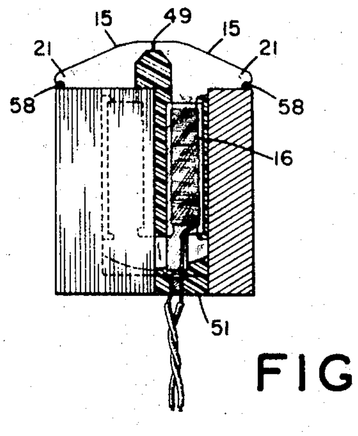
FIGURE 11 is an end view of the completed head

As shown in FIGURES 10 and 11, when the multichannel head is assembled the pole pieces 15, 15 register with each other and are in contact with each other preferably with a very thin shim 49 at the location of the transducing gap 34 as is known in the art. The back portion 21 of each pole piece is in engagement with the front face of the U-shaped bracket members. Due to the hammer head shape of the pole pieces which form the transducer heads, the two pole piece portions are substantially as wide as the bracket members when they are brought together face-to-face with their planar leg faces in engagement with each other and with their planar front faces spaced apart. Bolts (not shown) may extend through the bolt holes 50 to hold the two U-shaped brackets together, and the head is then turned upside down and hardenable plastic material is poured into the back opening 51 filling the space around the coils and between the shields and the head cores. The pole pieces, the shields, and the spacers are so closely positioned together that the full metal face established thereby prevents the liquid plastic from running out of the head. End members 77 are affixed to the front faces abutting the end assemblies of shields and spaces to provide marginal support for the magnetic tape.

While the end plates and spacers preferably are metallic certain ceramics may be used. The important thing is that the pole pieces, the shields and the spacers form a surface across which the tape runs which is free of the plastic used to fill the interior of the head.

A grounding wire 58 is soldered in the gap formed by the notch 22 in the pole pieces in order to electrically ground the pole pieces and the metal brackets to a ground wire on the terminal strip 46.

Figure 14:
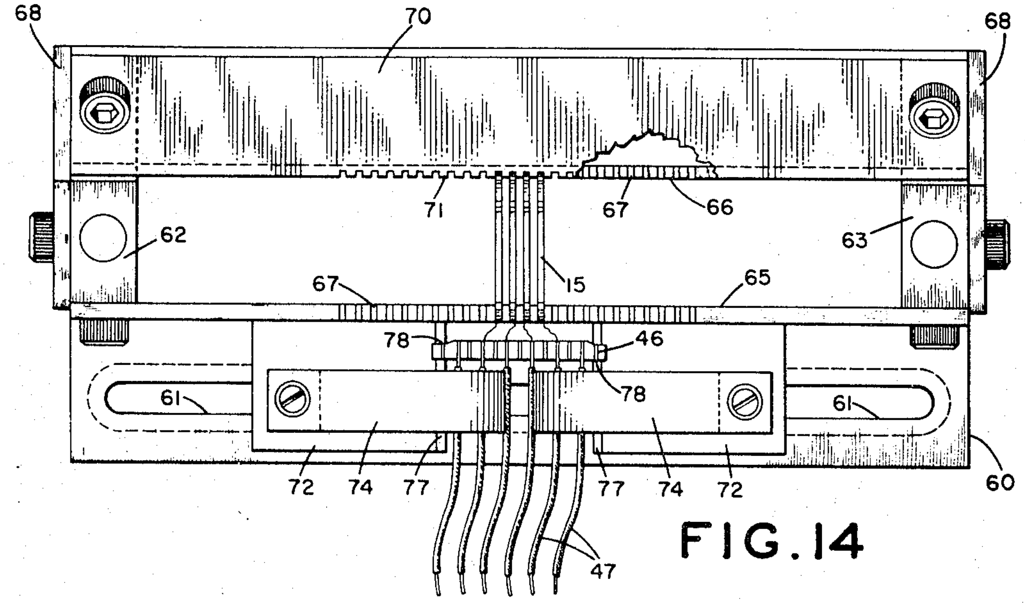
FIGURES 12, 13 and 14 are views showing the pole piece holding fixture which is essential to the accurate alignment and manufacture of the multichannel heads, FIGURE 12 being an end view, FIGURE 13 being a front face view, and FIGURE 14 being a top view.
Figure 13:
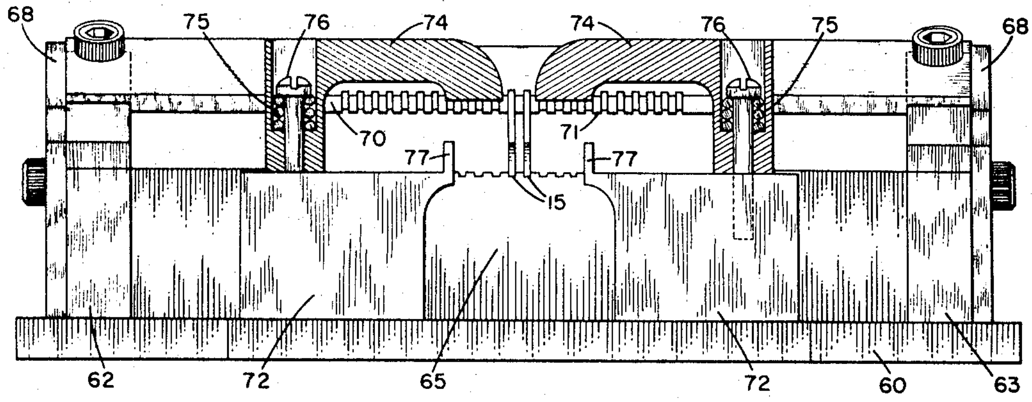
Figure 12:
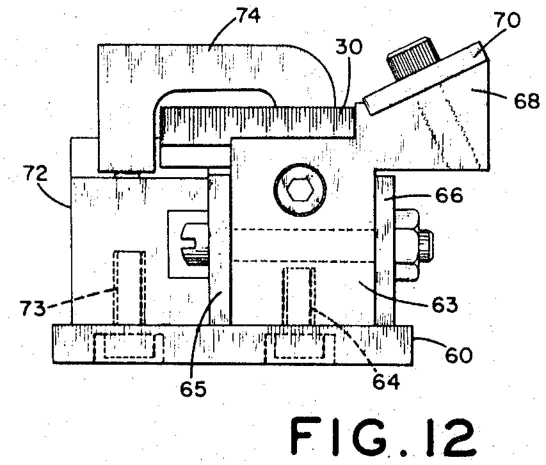

The assembly jig or fixture shown in FIGURES 12, 13, 14 is comprised of a base member 60 having a long slot 61 therein. End members 62, 63 are connected to the base 60 by means of screws 64. The end members 62, 63 are spaced apart and two notched pole pieces mounting and positioning rails 65, 66 are firmly connected to the end members. The upper surfaces of the pole piece mounting rails 65, 66 are accurately notched as shown in FIGURE 14 so that individual pole pieces can be placed across the rails and be held in accurately spaced relationship in the notches 67.

The end members 62, 63 each carry a backwardly extending wing member 68 to which is secured a third notched rail member 70 whose front edge 71 is notched similarly to the notches in rails 65, 66. The rail 70 is raised above the other two rails 65, 66 and there is thus provided three notches in three spaced apart rails to receive and hold each pole piece 15, two of which are shown in place in FIGURE 13 and four of which are shown in FIGURE 14.

Two adjustable posts 72 are connected to the base 60 by means of screws 73 so that they can be slid along the slots 61 and secured in a desired position. Each post 72 carries a spring-biased finger 74 which is biased down toward the post by means of a compression spring 75 around the screw 76 which connects the finger 74 to the post 72. Thus the finger may be lifted slightly above the post 72 and when it is released the spring 75 returns it to its downward position.

Each of the posts 72 carries an upstanding wall member 77, and in each wall member 77 there is a notch 78 to receive and position a terminal strip 46. The terminal strip 46 is shown in place in FIGURE 14, but is omitted from FIGURES 12 and 13 for the sake of clarity. The fingers 74 spring-bias one of the U-shaped brackets 30 or 31 against a plurality of the pole pieces during the assembly process, as shown in FIGURE 12. The U-shaped bracket, however, is omitted from FIGURES 13 and 14 for the sake of clarity.

The assembly jig or fixture can be used for making multichannel heads having two or more channels. Its length is sufficient to accommodate 28 channels, but obviously longer jigs can be made. If a 10 or 12 channel head is to be made on the same jig, the posts 72 are moved toward each other.

When a half-head is to be made, the posts 72 are moved to the proper spacing depending upon the number of channels desired, and they are then secured to the base so that no further sliding motion is permitted. A plurality of individual pole pieces 15 are carefully located in the notches in rails 65, 66 and 70, providing three points at which each pole piece is held. A terminal strip 46 of the proper length is then mounted in the two notches 78 in the walls 77 carried by the posts 72. The lead wires from the coils around the pole pieces are then soldered to the proper wires 47 on the terminal strip 46. Adhesive material is then applied to the terminal strip and to the pole pieces 15. A U-shaped bracked 30 is then carefully placed against the pole pieces 15 with all of the pole pieces positioned against the planar top surface 52 and inner face 35 thereof, and with the terminal strip 46 fitting in the grooves 45 in the U-shaped bracket. The two spring-biased fingers 74 are then lifted up and are swung over the back face of the bracket 30 and released so that they resiliently urge the bracket 30 against the pole pieces as the adhesive hardens. After the adhesive is set the sub-assembly is removed from the jig and is ready to be matched with another such sub-assembly. The two matched sub-assemblies are connected together such as by bolts, and thereafter a shield and spacer sub-assembly is positioned between each two adjacent pole pieces. Thereafter liquid, hardenable plastic material is poured into the head, preferably with the head upside down, to fill all the spaces underneath the spacers, and the end plates 77 are affixed to the brackets.

Testing of the various channels of the head during manufacture is facilitated by the use of the assembly jig. After the pole pieces are positioned in the jig and the coils 16 are connected to the terminal strip 46, a simple electrical check will indicate any open circuits. If a bad coil is found it is a simple operation to remove the core and coil and substitute another one. Even after two half-heads have been bolted together, if a defective channel is discovered it is a relatively inexpensive task to remove it and substitute a good one. Presence of the shield and spacer sub-assemblies does not cause too much trouble. It is only after the final potting step that correction of a defective channel becomes sufficiently expensive that it is not done.

We claim:

1. A multichannel magnetic transducer head for use with magnetic tape comprising: a first and a second substantially U-shaped bracket each having a top surface and a smooth planar inner face located between outwardly extending legs of the U, said legs terminating in planar leg faces the plane of which is parallel to the plane of said front face, means mounting said two U-shaped brackets together face-to-face with their said planar leg faces in engagement with each other and with their planar inner faces spaced apart, a first plurality of spaced apart core members secured to the smooth, planar inner face of the first said bracket and a second plurality of spaced apart core members secured to the smooth, planar inner face of the second said bracket and corresponding to said first plurality of core members to form a plurality of substantially closed magnetic core circuit means defining a plurality of transducing gaps, coil means wound around each of said magnetic core circuit means, a plurality of single-piece full shielding means with one of said shielding means located between each two adjacent magnet core circuit means, each of said shielding means having an extent at least equal to the extent of said magnetic core circuit means, and each of said shielding means being devoid of a gap at its location adjacent the said transducing gap in said core circuit means, and a plurality of spacer means between and in engagement with said magnetic core circuit means and said full shielding means spacing them apart a distance sufficient to accommodate the coil means wound around said magnetic core circuit means, said magnetic core circuit means, said shielding means and said spacer means together forming a full face against which said tape runs during recording or reproducing.

2. A multichannel magnetic transducer head as set forth in claim 1, further characterized by each of said plurality of core members having an elongated portion for engaging said tape, said elongated portions overlying the top surface of said U-shaped bracket and extending above the surface thereof, said plurality of spacer means and said plurality of shielding means also extending above the top surface of said U-shaped bracket and forming with said core members a smooth, arcuate full face across which said tape is adapted to move.

3. A multichannel magnetic transducer head as set forth in claim 1, further characterized by each of said plurality of core members having an elongated portion for engaging said tape, said elongated portions overlying the top surface of said U-shaped bracket and extending above the surface thereof, said plurality of spacer means and said plurality of shielding means also extending above the top surface of said U-shaped bracket and forming with said core members a smooth, arcuate full-metal face across which said tape is adapted to move, said spacer means engaging said core means and said shielding means substantially only in the areas thereof which extend above the top surface of said U-shaped bracket.

4. A multichannel magnetic transducer head for use with a magnetic tape, comprising, a first and a second substantially U-shaped bracket each having a smooth planar inner face located between outwardly extending legs of the U, said legs terminating in planar leg faces the plane of which is parallel to the plane of said inner face, and said bracket having a flat top surface, means connecting said two brackets together face-to-face with their planar leg faces in engagement with each other and with their smooth planar inner faces spaced apart, a first plurality of spaced apart core members secured to the smooth inner face of the first said bracket and a second plurality of spaced apart core members secured to the smooth inner face of the second said bracket and corresponding to said first plurality of core members to form a plurality of substantially closed magnetic core circuit means defining a plurality of transducing gaps, each of said core members having an elongated tape engaging portion extending above the top surface of said brackets, metal shielding means and metal spacer means located between and in engagement with said spaced apart core members completely filling the space therebetween with metal at least above the top surface of said U-shaped brackets whereby the magnetic tape engages only metal as it moves past said transducer head, and coil means wound around each of said magnetic core circuit means and located below said spacer means, each of said shielding means being a single-piece full shield having an extent at least equal to the extent of said magnetic core circuit means and being positioned between adjacent coil means, and each of said shielding means being devoid of a gap at its location adjacent the said transducing gap in said core circuit means.

References Cited

UNITED STATES PATENTS

| | | | |
|---|---|---|---|
| 2,915,812 | 12/1959 | Rettinger | 179—100.2 |
| 3,064,333 | 11/1962 | Kristiansen et al. | 179—100.2 |
| 3,065,311 | 11/1962 | Kornei | 179—100.2 |
| 3,327,313 | 6/1967 | Oliver | 340—174.1 |

BERNARD KONICK, *Primary Examiner.*

BARRY L. HALEY, *Assistant Examiner.*

U.S. Cl. X.R.

179—100.2; 346—74